United States Patent
Ogawa et al.

(10) Patent No.: US 10,533,115 B2
(45) Date of Patent: Jan. 14, 2020

(54) LAYER MIGRATION CONTROL AGENT

(71) Applicant: KUSUMOTO CHEMICALS, LTD., Tokyo (JP)

(72) Inventors: Kohei Ogawa, Saitama-ken (JP); Yasuhiro Oiwa, Saitama-ken (JP); Makoto Ubukata, Saitama-ken (JP)

(73) Assignee: KUSUMOTO CHEMICALS, LTD., Tokyo (JP)

(*) Notice: Subject to any disclaimer, the term of this patent is extended or adjusted under 35 U.S.C. 154(b) by 0 days.

(21) Appl. No.: 15/665,613

(22) Filed: Aug. 1, 2017

(65) Prior Publication Data

US 2018/0044551 A1 Feb. 15, 2018

(30) Foreign Application Priority Data

Aug. 9, 2016 (JP) ................. 2016-156611

(51) Int. Cl.
*C09D 187/00* (2006.01)
*C08F 10/14* (2006.01)
*C08F 216/06* (2006.01)
*C08F 220/06* (2006.01)
*C08F 283/06* (2006.01)

(52) U.S. Cl.
CPC .......... *C09D 187/005* (2013.01); *C08F 10/14* (2013.01); *C08F 216/06* (2013.01); *C08F 220/06* (2013.01); *C08F 283/06* (2013.01)

(58) Field of Classification Search
None
See application file for complete search history.

(56) References Cited

U.S. PATENT DOCUMENTS

| | | | | |
|---|---|---|---|---|
| 6,160,048 A * | 12/2000 | Uyeda | ............ | C08F 255/02 524/504 |
| 2003/0193553 A1* | 10/2003 | Issler | ............ | B41J 2/2114 347/100 |
| 2005/0020730 A1* | 1/2005 | Valentini | ............ | C09D 11/324 523/160 |
| 2005/0090599 A1* | 4/2005 | Spinelli | ............ | B01F 17/0028 524/543 |
| 2006/0287437 A1* | 12/2006 | Ma | ............ | C08F 293/005 525/242 |
| 2007/0190312 A1* | 8/2007 | Hazan | ............ | B05D 7/14 428/323 |
| 2007/0270510 A1* | 11/2007 | Liu | ............ | B01F 17/0028 516/72 |
| 2008/0108743 A1 | 5/2008 | Tomizaki et al. | | |
| 2010/0143589 A1* | 6/2010 | Spinelli | ............ | C08G 18/0823 427/256 |

FOREIGN PATENT DOCUMENTS

| JP | 2003-292877 | | 10/2003 |
|---|---|---|---|
| JP | 2007-56161 | | 3/2007 |
| JP | 2008-138179 | | 6/2008 |
| JP | 2011189273 | A * | 9/2011 |
| JP | 2011-219581 | | 11/2011 |
| JP | 2012-240032 | | 12/2012 |

OTHER PUBLICATIONS

English machine Translation of JP2011189273 obtained Oct. 13, 2018. (Year: 2018).*
Extended European Search Report dated Jan. 12, 2018 in European Application No. 17184465.7.
Database CAPLUS [Online] Chemical Abstracts Service, Columbus Ohio, US; Oct. 29, 2011 (Oct. 29, 2011), Anzai, Yasuhiro: "Antisoiling coating layers with good water resistance, their manufacture, and coated products", XP002776908, Database acession No. 2011:1228621; & JP 2011 189273 A (DAINIPPON TORYO KK) Sep. 29, 211 (Sep. 29, 2011).
Database CAPLUS [Online] Chemical Abstracts Service, Columbus Ohio, US; Apr. 8, 2010 (Apr. 8, 2010), Horie, Miyako: "Antisoiling water-based acrylic coating compositions for building interiors and exteriors", XP002776909, Database accession No. 2010:433699; & JP 2010-077357 A (DAINIPPON TORYO KK) Apr. 8, 2010 (Apr. 8, 2010).

* cited by examiner

*Primary Examiner* — Christopher M Rodd
(74) *Attorney, Agent, or Firm* — Wenderoth, Lind & Ponack, L.L.P.

(57) ABSTRACT

Provided is a novel layer migration control agent that is added to a paint composition when forming a multilayer coating film on a coating object by curing a prime coating film and a top coating film at the same time, the agent making it possible to control layer migration of the two coating films and obtain the multilayer coating film with satisfactory finish appearance. The layer migration control agent is a copolymer obtained by copolymerization of a monomer mixture including 5% by weight to 90% by weight of a polymerizable unsaturated monomer including an ether group and 10% by weight to 95% by weight of a polymerizable unsaturated monomer having a hydrophobic group having 1 to 22 carbon atoms, the copolymer having a weight average molecular weight of 1000 to 100,000.

8 Claims, No Drawings

LAYER MIGRATION CONTROL AGENT

TECHNICAL FIELD

The present invention relates to a layer migration control agent that is used when a paint is coated in multiple layers. Specifically, the present invention relates to a layer migration control agent that is added to a paint when a multilayer coating film is formed by the so-called wet-on-wet coating process in which a prime coating layer is provided on a coating object, then a top coating layer is coated on the surface of the prime coating layer without curing the same, and the two layers are then cured by baking at the same time, the addition making it possible to suppress layer migration at the wet coating film interface and provide a cured coating film of satisfactory appearance. More specifically, the present invention relates to a cured multilayer coating film formation method using such a layer migration control agent.

BACKGROUND ART

When coating automobile bodies or the like, a coating method has been conventionally used by which a primer paint is initially coated by electrodeposition on the automobile body and cured by baking, and then an interlayer paint is coated on the cured prime coating film and cured by baking, the so-called metallic paint including metallic pigments is coated as a top coating on the cured interlayer coating film, a clear paint is then overcoated in a wet-on-wet state without curing the metallic paint, and the uncured metallic paint layer and clear paint layer are then cured at the same time. In recent years, a three-wet coating method in which three layers, namely, an interlayer, a metallic paint layer, and a clear paint layer are cured by baking at the same time has been also put to practical used. A cured multilayer coating film formed by such a method is required to demonstrate excellent coating film appearance due to satisfactory orientation of flaky metallic pigments such as aluminum contained in the metallic coating film. However, the drawback of the conventional wet-on-wet method is that the uncured metallic paint layer and the uncured clear paint layer are mixed with each other at the time of coating, thereby degrading the orientation of metallic pigment particles in the cured multilayer coating film and decreasing gloss (the so-called "return unevenness"). Further, in three-wet coating, it is also required to omit or shorten a preheating step, that is, drying step, in order to reduce the release of $CO_2$ and save energy.

A method of compounding urethane-crosslinked fine particles with a paint (PTL 1 and 2), a method of compounding a diester compound with a paint (PTL 3), a method of compounding an ethylene-α-olefin random copolymer with a paint (PTL 4), and a method of compounding a polyvalent amine polymer with a paint (PTL 5) have been used as means for preventing the wet paint layers from mixing with each other.

CITATION LIST

Patent Literature

PTL 1: Japanese Patent Application Publication No. 2003-292877
PTL 2: Japanese Patent Application Publication No. 2007-056161
PTL 3: Japanese Patent Application Publication No. 2008-138179
PTL 4: Japanese Patent Application Publication No. 2011-219581
PTL 5: Japanese Patent Application Publication No. 2012-240032

DISCLOSURE OF THE INVENTION

Problem to be Solved by the Invention

However, with such conventional method, sufficient appearance of the cured coating film is difficult to obtain. Other inconveniences include low water resistance and long drying time of the cured coating film.

Accordingly, it is an object of the present invention to suppress layer migration at the interface of a multilayer coating film formed by a wet-on-wet method and, without degrading water resistance, suppress the degradation of finish appearance of a cured coating film and shorten drying time.

Means for Solving the Problem

The inventors of the present invention have conducted a comprehensive research aimed at the resolution of the abovementioned problems and have found that the abovementioned object can be attained by compounding a copolymer having a specific composition as a layer migration control agent with a paint. This finding led to the completion of the present invention.

Thus, the present invention provides a layer migration control agent, a paint composition including the layer migration control agent, an article coated with the paint composition, and a coating film forming method using the paint composition as described in 1. to 9. below.

1. A layer migration control agent for a paint, including a copolymer obtained by polymerization of a monomer mixture including 5% by weight to 90% by weight of a polymerizable unsaturated monomer (A) including at least one kind of ether group selected from a group represented by the following chemical formula (1):

$$R^1-(C_mH_{2m}O)_n-R^2 \qquad (1)$$

(in the chemical formula (1), $R^1$ is a (meth)acryl group, a vinyl ether group, or an allyl group; $R^2$ is a hydrogen atom, a (meth)acryl group, a vinyl ether group, an allyl group, or an alkyl group having 1 to 22 carbon atoms; m is a number of 2 to 4; n is a number of 2 to 100), and 10% by weight to 95% by weight of a polymerizable unsaturated monomer (B) of at least one kind selected from the group consisting of polymerizable unsaturated monomers having a hydrophobic group, wherein the copolymer has a weight average molecular weight of 1000 to 100,000.

2. A layer migration control agent for a paint, including a copolymer obtained by polymerization of a monomer mixture including a polymerizable unsaturated monomer (A) including at least one kind of ether group selected from a group represented by the following chemical formula (1):

$$R^1-(C_mH_{2m}O)_n-R^2 \qquad (1)$$

(in the chemical formula (1), $R^1$ is a (meth)acryl group, a vinyl ether group, or an allyl group; $R^2$ is a hydrogen atom, a (meth)acryl group, a vinyl ether group, an allyl group, or an alkyl group having 1 to 22 carbon atoms; m is a number of 2 to 4; n is a number of 2 to 100), a polymerizable unsaturated monomer (B) of at least one kind selected from the group consisting of polymerizable unsaturated monomers having a hydrophobic group, and a polymerizable unsaturated monomer (C) of at least one kind selected from the group consisting of copolymerizable unsaturated monomers, wherein the monomer mixture includes 100 parts by weight of a mixture of 5% by weight to 90% by weight of the monomer (A) and 10% by weight to 95% by weight of the monomer (B), and 50 parts by weight or less of the monomer (C), and the weight average molecular weight of the copolymer is 1000 to 100,000.

3. The layer migration control agent according to clause 1 or 2 above, wherein the polymerizable unsaturated monomer (B) having a hydrophobic group is a polymerizable unsaturated monomer of at least one kind selected from the group including polymerizable unsaturated monomers having a linear portion, a branched portion, or a ring portion having 1 to 22 carbon atoms.

4. The layer migration control agent according to any one of clauses 1 to 3 above, wherein the polymerizable unsaturated monomer (C) is a polymerizable unsaturated monomer of at least one kind selected from the group including a polymerizable unsaturated monomer having a hydroxyl group, a polymerizable unsaturated monomer having an amide group, a polymerizable unsaturated monomer having a glycol group, a polymerizable unsaturated monomer having a glycidyl group, a polymerizable unsaturated monomer having a carboxyl group, a polyfunctional unsaturated monomer, and a reactive silicone having a methacryloyloxy group.

5. A paint composition including the layer migration control agent according to any one of clauses 1 to 4 above at 3% by weight to 15% by weight per weight of a resin solid component contained in the paint.

6. An article coated with the paint composition set forth in clause 5 above.

7. A method for forming a cured multilayer coating film, including:
(1) a step of prime-coating a paint composition according to clause 5 above on a coating object;
(2) a step of coating a top paint composition on an uncured prime coated surface obtained in (1); and
(3) a step of heating the uncured multilayer coating film of (2) to cure both prime and top coating films at the same time.

8. The method for forming a coating film according to clause 7 above, wherein the prime paint composition includes an aqueous resin and a hydrophobic melamine resin as film-forming resin components, and a solid component mixing ratio of the hydrophobic melamine resin to the aqueous resin is 20-40 to 60-80 as a weight ratio.

9. The layer migration control agent according to any one of clauses 1 to 4 above, which makes it possible to shorten the drying time of a paint.

Advantageous Effect of the Invention

As a result of adding the layer migration control agent of the present invention to a paint, mixing of the prime paint layer and the top paint layer coated by a wet-on-wet method on the prime paint layer can be suppressed, degradation of the finish appearance of the cured coating film can be suppressed without degrading water resistance, and the drying time can be shortened.

MODE FOR CARRYING OUT THE INVENTION

The layer migration control agent of the present invention is a graft copolymer obtained using an ether group-containing polymerizable unsaturated monomer (A) and a polymerizable unsaturated monomer (B) having a hydrophobic group as the main starting materials, the molecular skeleton thereof being configured of a hydrophobic trunk polymer derived from the monomer (B) and a hydrophilic branch polymer composed of an ether group derived from the monomer (A).

The ether group-containing polymerizable unsaturated monomer (A) is a polymerizable unsaturated monomer including an ether group, which is represented by the following chemical formula (1):

$$R^1-(C_mH_{2m}O)_n-R^2 \quad (1)$$

(in the chemical formula (1), $R^1$ is a (meth)acryl group, a vinyl ether group, or an allyl group; $R^2$ is a hydrogen atom, a (meth)acryl group, a vinyl ether group, an allyl group, or an alkyl group having 1 to 22 carbon atoms; m is a number of 2 to 4; n is a number of 2 to 100).

Examples of the ether group-containing polymerizable unsaturated monomer (A) include (meth)acrylates such as polyethylene glycol mono(meth)acrylate, poly(ethylene-propylene) glycol mono(meth)acrylate, polypropylene glycol mono(meth)acrylate, polytetramethylene glycol mono (meth)acrylate, methoxypolyethylene glycol (meth)acrylate, methoxypolypropylene glycol (meth)acrylate, methoxypoly (ethylene-propylene) glycol (meth)acrylate, methoxypoly (ethylene-tetramethylene) glycol (meth)acrylate, butoxy-poly(ethylene-propylene) glycol (meth)acrylate, octoxypolyethylene glycol (meth)acrylate, lauroxypolyethylene glycol (meth)acrylate, stearoxypolyethylne glycol (meth)acrylate, behenyloxypolyethylene glycol (meth)acrylate, phenoxypolyethylene glycol (meth)acrylate, nonylphenoxypolyethylene glycol (meth)acrylate, polyethylene glycol di(meth)acrylate, polypropylene glycol di(meth) acrylate, ethoxylatepolypropylene glycol di(meth)acrylate, and polytetramethylene glycol di(meth)acrylate; allyl ethers such as polyethylene glycol monoallyl ether, polypropylene glycol monoallyl ether, methoxypolyethylene glycol allyl ether, polyethylene glycol polypropylene glycol monoallyl ether, butoxypolyethylene glycol polypropylene glycol monoallyl ether, polyethylene glycol diallyl ether, and polypropylene glycol diallyl ether; and vinyl ethers such as polyethylene glycol monovinyl ether and polypropylene glycol monovinyl ether. These monomers may be used singly or in combination of two or more thereof.

The length n of the ether chain in the ether group-containing polymerizable unsaturated monomer (A) is preferably 2 to 100, and more preferably 4 to 50. When n is less than 2 or more than 100, the effect of obtaining satisfactory coating film appearance cannot be confirmed.

The amount of the ether group-containing polymerizable unsaturated monomer (A) is preferably 5% by weight to 90% by weight, and more preferably 25% by weight to 85% by weight. Where this amount is more than 90% by weight, although satisfactory finish appearance as a result of suppressing the migration of layers can be obtained, water resistance decreases. Further, where the amount is less than 5% by weight, the effect of obtaining satisfactory finish appearance as a result of suppressing the migration of layers cannot be confirmed.

The polymerizable unsaturated monomer (B) having a hydrophobic group is a polymerizable unsaturated monomer of at least one kind selected from the group consisting of polymerizable unsaturated monomers having a linear portion, a branched portion, or a ring portion having 1 to 22 carbon atoms. Examples of such monomers include acrylates and methacrylates such as methyl (meth)acrylate, ethyl (meth)acrylate, normal propyl (meth)acrylate, isopropyl (meth)acrylate, normal butyl (meth)acrylate, isobutyl (meth)acrylate, tertiary butyl (meth)acrylate, hexyl (meth)acrylate, normal octyl (meth)acrylate, isooctyl (meth)acrylate, 2-ethylhexyl (meth)acrylate, isononyl (meth)acrylate, normal decyl (meth)acrylate, isodecyl (meth)acrylate, lauryl (meth)acrylate, stearyl (meth)acrylate, isostearyl (meth)acrylate, oleyl (meth)acrylate, behenyl (meth)acrylate, benzyl (meth)acrylate, cyclohexyl (meth)acrylate, and isobornyl (meth)acrylate; vinyl ethers such as methyl vinyl ether, ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, decyl vinyl ether, lauryl vinyl ether, stearyl vinyl ether, and behenyl vinyl ether; vinyl esters such as vinyl acetate, vinyl neononate, 2,2-dimethyloctanoic acid vinyl ester, and vinyl neoundecanoate; maleic acid dialkyl esters such as dimethyl maleate, diethyl maleate, diisopropyl maleate, dibutyl maleate, di-2-ethylhexyl maleate, dilauryl maleate, and distearyl maleate; fumaric acid dialkyl esters such as dimethyl fumarate, diethyl fumarate, diisopropyl fumarate, dibutyl fumarate, di-2-ethylhexyl fumarate, dilauryl fumarate, and distearyl fumarate; itaconic acid dialkyl esters such as dimethyl itaconate, dibutyl itaconate, di-2-ethyl-hexyl itaconate, dilauryl itaconate, and distearyl itaconate; aromatic hydrocarbon vinyl compounds such as styrene, α-methylstyrene, chlorostyrene, and vinyl toluene; and α-olefins such as 1-hexene, 1-octene, and 1-dodecene. These monomers may be used singly or in combination of two or more thereof.

The amount of the polymerizable unsaturated monomer (B) having a hydrophobic group is preferably 10% by weight to 95% by weight, and more preferably 15% by weight to 75% by weight. Where this amount is more than 95% by weight, the effect of obtaining satisfactory finish appearance as a result of suppressing the migration of layers cannot be achieved. Where the amount is less than 10% by weight, although satisfactory finish appearance as a result of suppressing the migration of layers can be obtained, water resistance decreases.

Examples of the copolymerizable unsaturated monomer (C) include hydroxyl group-containing acrylates and methacrylates, which are monoester compounds of (meth)acrylic acid and a dihydric alcohol having 2 to 8 carbon atoms, such as 2-hydroxyethyl (meth)acrylate, 2-hydroxypropyl (meth)acrylate, 2-hydroxy-1-methylethyl (meth)acrylate, 4-hydroxybutyl (meth)acrylate, and 3-hydroxy-2,2-dimethylpropyl (meth)acrylate; glycol (meth)acrylates such as methoxypolyethylene glycol (meth)acrylate, methoxypropylene glycol(meth)acrylate, phenoxyethylene glycol (meth)acrylate, and phenoxypropylene glycol (meth)acrylate; acrylamides and methacrylamides such as acrylamide, N-methylacrylamide, N-methylmethacrylamide, N-methylolacrylamide butyl ether, N-methylolmethacrylamide butyl ether, N-ethylacrylamide, N-ethylmethacrylamide, N-n-propylacrylamide, N-n-propylmethacrylamide, N-isopropylacrylamide, N-isopropylmethacrylamide, N-cyclopropylacrylamide, N-cyclopropylmethacrylamide, diacetone acrylamide, diacetone methacrylamide, N-hydroxymethylacrylamide, N-hydroxymethylmethacrylamide, N-hydroxyethylacrylamide, N-hydroxyethylmethacrylamide, N,N-dimethylacrylamide, N,N-dimethylmethacrylamide, N,N-diethylacrylamide, N,N-diethylmethacrylamide, N-methyl, N-ethylacrylamide, N-methyl, N-ethylmethacrylamide, N,N-dimethylaminopropylacrylamide, N,N-dimethylaminopropylmethacrylamide, N-methylolacrylamide methyl ether, N-methylolmethacrylamide methyl ether, N-methylolacrylamide ethyl ether, N-methylolmethacrylamide ethyl ether, N-methylolacrylamide propyl ether, N-methylolmethacrylamide propyl ether, acryloylmorpholine, and methacryloylmorpholine; hydrophilic vinyl compounds such as N-vinyl-2-pyrrolidone; carboxyl group-containing polymerizable unsaturated monomers such as (meth)acrylic acid, maleic acid, fumaric acid, itaconic acid, crotonic acid, and β-carboxyethylacrylate; glycidyl group-containing polymerizable unsaturated monomers such as glycidyl (meth)acrylate and acrylglycidyl ether; reactive silicones having a methacryloyloxy group (Silaplane FM-0711, FM-0721, and FM-0725 manufactured by JNC Corporation; AK-5 and AK-30 manufactured by Toagosei Co., Ltd.; X-22-164A, X22-164B, and X-22-164C manufactured by Shin-Etsu Chemical Co., Ltd.); and polyfunctional unsaturated monomers such as divinylbenzene, ethylene glycol di(meth)acrylate, propylene glycol di(meth)acrylate, tetramethylene glycol di(meth)acrylate, 1,6-hexamethylene glycol di(meth)acrylate, and neopentyl glycol di(meth)acrylate. These monomers may be used singly or in combination of two or more thereof.

The copolymerizable unsaturated monomer (C) is not particularly limited. However, as a copolymerizable unsaturated monomer (C) for producing a layer migration control agent for a thermosetting paint, a monomer having a functional group reactive with a curing agent which is a constituent component of the thermosetting paint is preferred because such a monomer is apparently effective for improving water resistance of the cured coating film. A monomer including a hydroxyl group is preferred for a paint using a melamine compound or an isocyanate compound as a curing agent.

The amount of the copolymerizable unsaturated monomer (C) is preferably 50 parts by weight or less per the total number of parts by weight of the monomer (A) and the monomer (B). Where the amount of the copolymerizable unsaturated monomer (C) is more than 50 parts by weight per the total number of parts by weight of the monomer (A) and the monomer (B), satisfactory finish appearance as a result of suppressing the migration of layers is difficult to obtain.

When a hydroxyl group-containing monomer is used as the copolymerizable unsaturated monomer (C), it is preferable that the hydroxyl value of the copolymer be 10 mg KOH/g to 140 mg KOH/g. Where the hydroxyl value is less than 10 mg KOH/g, the effect of improving water resistance is low, and where the hydroxyl value is more than 140 mg KOH/g, stability of the paint is decreased.

The hydroxyl value of the copolymer used in the present invention is determined in the number of milligrams of potassium hydroxide required to neutralize acetic acid bonded to the hydroxyl group when 1 g of a sample is acetylated according to JIS-0070-1992.

Further, in the present invention, "(meth)acrylate" is at least one selected from "acrylate" and "methacrylate".

A solution polymerization method, a dispersion polymerization method, a lump polymerization method, an emulsion polymerization method, a suspension polymerization method, and the like can be used for synthesizing the copolymer used in the present invention, and an azo polymerization initiator or a peroxide can be used as an initiator. Since the present invention relates to the functions of the copolymer, the synthesis method is not particularly limited.

The weight average molecular weight (abbreviated hereinbelow as Mw) of the copolymer used in the present invention is preferably 1000 to 100,000, and more preferably 2000 to 60,000. Where Mw is less than 1000 or more than 100,000, it is impossible to obtain a cured coating film having satisfactory finish appearance as a result of suppressing the migration of layers and sufficient water resistance.

In the present specification, the weight average molecular weight is a value calculated from a chromatogram measured by gel permeation chromatography (GPC) by using the molecular weight of standard polystyrene as a reference. "HLC8120GPC" (trade name, manufactured by Tosoh Corporation) and 4 columns (two "TSKgel GMHxL", "TSKgel G-2500HxL", and "TSKgel G-2000HxL"; trade names, all are manufactured by Tosoh Corporation) were used for gel permeation chromatography. This operation was conducted under the condition where tetrahydrofuran was used as a mobile phase, the measurement temperature was 40° C., the flow velocity was 1 cc/min, and an RI detector was used.

For a nonionic copolymer including no carboxylic acid, among the copolymers used in the present invention, the HLB thereof is preferably 0.5 to 17.0, and more preferably 4.0 to 14.0. Where the HLB is equal to or less than 0.5, satisfactory finish appearance as a result of suppressing the migration of layers is difficult to obtain, and where the HLB is equal to or greater than 17.0, water resistance of the cured coating film is decreased.

The HLB, as referred to in the present specification, is a value which is obtained by a Griffin method and calculated by using the following formula 1 which is based on the structural formula of the copolymer.

$$HLB\ value = 20 \times (\text{total formula weight of hydrophilic portion})/(\text{molecular weight}) \quad \text{Formula 1}$$

The layer migration control agent of the present invention may optionally include a surfactant to facilitate dispersion in a paint. The surfactant to be used is not particularly limited, and a nonionic surfactant and/or an ionic surfactant may be used.

Examples of nonionic surfactants include polyoxyethylene alkyl ethers, polyoxyethylene alkylaryl ethers, polyoxyethylene alkyl esters, sorbitan aliphatic esters, polyoxyethylene sorbitan aliphatic esters, and polyoxyethylene oxypropylene copolymers. These surfactants may be used singly or in combination.

Examples of ionic surfactants include anionic surfactants such as alkyl fatty acid salts, alkyl sulfuric acid ester salts, polyoxyethylene alkyl ether sulfates, alkylbenzene sulfonates, sulfosuccinates, and phosphoric acid ester salts; cationic surfactants such as alkyl amine salts and quaternary ammonium salts; and amphoteric surfactants such as alkyl betaines. These surfactants may be used singly or in combination.

The layer migration control agent of the present invention may optionally include water or an organic solvent to facilitate dispersion in a paint. Examples of suitable organic solvents include aliphatic hydrocarbons, alicyclic hydrocarbons, aromatic hydrocarbons, ketones, esters, alcohols, and ethers, but organic solvents which have been used in the general aqueous coating materials are preferred. Examples of such organic solvents include methyl alcohol, ethyl alcohol, propyl alcohol, isopropyl alcohol, butyl alcohol, isobutyl alcohol, pentyl alcohol, hexyl alcohol, heptyl alcohol, octyl alcohol, 2-ethylhexyl alcohol, ethylene glycol monomethyl ether, diethylene glycol monomethyl ether, triethylene glycol monomethyl ether, ethylene glycol monoisopropyl ether, ethylene glycol monobutyl ether, diethylene glycol monobutyl ether, triethylene glycol monobutyl ether, ethylene glycol monoisobutyl ether, ethylene glycol monohexyl ether, ethylene glycol mono-2-ethylhexyl ether, propylene glycol monomethyl ether, dipropylene glycol monomethyl ether, propylene glycol monopropyl ether, and propylene glycol monobutyl ether. These solvents may be used singly or in combination.

The layer migration control agent of the present invention can include other substances within ranges in which the properties thereof and the object of the present invention are not impaired. Examples of such additives include a surfactant, a film forming enhancer, a drier, a contamination preventing agent, a thickener, an antioxidant, a UV absorber, a waterproofing agent, a corrosion and rust inhibitor, an antifoaming agent, a leveling agent, a dispersant, a fireproofing agent, an adhesion improving agent, a colorant, an antistatic agent, a peeling agent, a coupling agent, a deodorizing agent, a perfume, and a dye.

The amount added of the layer migration control agent according to the present invention differs depending on the amount of the resin contained in the paint and the type and amount of a pigment, but is usually 3% by weight to 15% by weight, and more preferably 3% by weight to 10% by weight on the basis of the resin solid component contained in the paint. Where the amount added is less than 3% by weight, sufficient finish appearance of the cured coating film cannot be obtained. It is undesirable that this amount be more than 15% by weight because adhesion to the top-layer paint is impaired.

The layer migration control agent according to the present invention can be added to the paint at any time. Thus, the control agent can be added in the process of kneading a pigment or after the paint has been produced.

The paint composition to which the layer migration control agent of the present invention is to be added may be in any form, for example, in the form of a solvent-based paint, aqueous paint, solvent-free paint, or powdered paint, but aqueous paint is preferred.

Examples of synthetic resins for use in the paint include an acrylic resin, an alkyd resin, a polyester resin, a urethane resin, and an epoxy resin. Further, where a curing agent can be included, for example, an amino resin, a melamine resin, an isocyanate compound, a block isocyanate compound, and an epoxy compound can be used.

Examples of suitable pigments and fillers include light-interference flaky pigments such as aluminum oxide, an interference mica pigment, and a white mica pigment; organic pigments such as azo chelate pigments, insoluble azo pigments, condensation azo pigments, an indigo pigment, phthalocyanine pigments, dioxane pigments, perinone pigments, perylene pigments, quinacridone pigments, and isoindolinone pigments; and inorganic pigments such as chrome yellow, yellow iron oxide, red iron oxide, carbon black, titanium dioxide, aluminum, copper, zinc, iron, nickel, and tin.

When the paint is prepared, for example, a method can be used by which a compounded material such as a pigment is kneaded using a kneader or a roll and dispersed with a sand grinding mill or a disperser.

The paint to which the layer migration control agent of the present invention has been added can include other substances within ranges in which the properties thereof and the object of the present invention are not impaired. Examples of such additives include a surfactant, a film forming enhancer, a drier, a contamination preventing agent, a thickener, an antioxidant, a UV absorber, a waterproofing agent, a corrosion and rust inhibitor, an antifoaming agent, a leveling agent, a dispersant, a fireproofing agent, an adhesion improving agent, a colorant, an antistatic agent, a peeling agent, a coupling agent, a deodorizing agent, a perfume, and a dye.

A base material to be coated with the paint to which the layer migration control agent of the present invention has been added is not particularly limited, and coating is implemented on, for examples, suitable base materials made from metals, plastics, wood, rubber, glass, stones, cement, mortar agents, and ceramics.

Any coating method can be used, examples thereof including spray coating, roller coating, brush coating, curtain coating, bar coating, and doctor blade coating.

When a cured multilayer coating film is prepared according to the present invention, for example, the top layer paint is coated without curing the prime paint to which the layer migration control agent has been added. In this case, it is preferable that after coating the prime paint to which the layer migration control agent of the present invention has been added, the unnecessary solvent (volatile component such as water or an organic solvent) is removed, as necessary, without curing, by performing natural drying or preheating drying, and the top paint is then coated. In particular, when the prime paint is an aqueous paint, it is preferable that the top layer coating be performed after the prime paint has been dried by preheating.

Any method can be used for simultaneously curing the paint to which the layer migration control agent of the present invention has been added and the top paint. For example, normal-temperature curing, thermal curing, and UV curing can be used, but thermal curing is particularly preferred.

No particular limitation is placed on the application of the paint composition to which layer migration control agent of the present invention has been added, but preferable application includes prime paints for coating by a wet-on-wet method for various interior or exterior applications, or for automobile or automobile repair.

When painting interiors and exteriors of buildings, where the prime paint is an aqueous paint, in particular, in the case of natural drying in which no preheating is used, significant time is required to evaporate water and the like. Therefore, a long interval is required before the top paint is coated. However, where the paint including the layer migration control agent of the present invention is used as the prime paint, the drying time can be shortened. Therefore, the interval between the prime coating and top coating can be shortened.

EXAMPLES

The present invention is specifically explained hereinbelow with reference to examples. However, the present invention is not limited to these examples. In the examples, "parts" and "%" stand for "parts by weight" and "% by weight", unless specifically stated otherwise.

Production Example 1

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 87.0 parts of methoxypolyethylene glycol methacrylate (trade name NK Ester M-90G, manufactured by Shin Nakamura Chemical Co., Ltd.), 130.4 parts of 2,2-dimethyloctanoic acid vinyl ester (trade name VeoVa 10, manufactured by Hexion Inc.), 32.6 parts of 2-hydroxyethyl methacrylate, 80.0 parts of butyl propylene glycol, and 20.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [1]. The weight average molecular weight of the synthesized copolymer was 4300, the hydroxyl value was 56 mg KOH/g, and the HLB calculated value was 5.9.

Production Example 2

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 119.1 parts of methoxypolyethylene glycol acrylate (trade name Blemmer AME-400, manufactured by NOF CORPORATION), 23.8 parts of stearyl acrylate, 95.2 parts of 2,2-dimethyloctanoic acid vinyl ester (trade name VeoVa 10, manufactured by Hexion Inc.), 11.9 parts of 2-hydroxyethyl acrylate, 80.0 parts of butyl propylene glycol, and 2.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [2]. The weight average molecular weight of the synthesized copolymer was 22,000, the hydroxyl value was 23 mg KOH/g, and the HLB calculated value was 8.0.

Production Example 3

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 133.9 parts of methoxypolyethylene glycol methacrylate (trade name NK Ester M-40G, manufactured by Shin Nakamura Chemical Co., Ltd.), 17.9 parts of methoxypolyethylene glycol methacrylate (trade name NK Ester M-450G, manufactured by Shin Nakamura Chemical Co., Ltd.), 8.9 parts of 2-ethylhexyl methacrylate, 17.9 parts of 2,2-dimethyloctanoic acid vinyl ester (trade name VeoVa 10, manufactured by Hexion Inc.), 71.4 parts of 2-hydroxyethyl methacrylate, 80.0 parts of butyl propylene glycol, and 27.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, 2.5 parts of polyethylene glycol monooleyl ether (trade name Emalex 510, manufactured by Nihon Emulsion Co., Ltd.) was added as a surfactant and a solid component was adjusted to 50% with butyl propylene glycol to obtain a layer migration control agent [3]. The weight average molecular weight of the synthesized copolymer was 2100, the hydroxyl value was 123 mg KOH/g, and the HLB calculated value was 8.9.

Production Example 4

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 71.4 parts of methoxypolyethylene glycol methacrylate (trade name NK Ester M-90G, manufactured by Shin Nakamura Chemical Co., Ltd.), 71.4 parts of polyethylene glycol dimethacrylate (trade name Blemmer PDE-600, manufactured by NOF CORPORATION), 95.2 parts of lauryl methacrylate, 12.0 parts of 2-hydroxyethyl methacrylate, 80.0 parts of butyl propylene glycol, and 76.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [4]. The weight average molecular weight of the synthesized copolymer was 3500, the hydroxyl value was 21 mg KOH/g, and the HLB calculated value was 9.2.

Production Example 5

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 53.6 parts of methoxypolyethylene glycol acrylate (trade name Blemmer AME-400, manufactured by NOF CORPORATION), 53.6 parts of polyethylene glycol diacrylate (trade name Blemmer ADE-300, manufactured by NOF CORPORATION), 71.4 parts of stearyl acrylate, 71.4 parts of 2-hydroxyethyl acrylate, 80.0 parts of butyl propylene glycol, and 32.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [5]. The weight average molecular weight of the synthesized copolymer was 23,000, the hydroxyl value was 138 mg KOH/g, and the HLB calculated value was 7.4.

Production Example 6

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 43.5 parts of methoxypolyethylene glycol methacrylate (trade name NK Ester M-40G, manufactured by Shin Nakamura Chemical Co., Ltd.), 65.2 parts of polyethylene glycol dimethacrylate (trade name Blemmer PDE-400, manufactured by NOF CORPORATION), 108.7 parts of 2,2-dimethyloctanoic acid vinyl ester (trade name VeoVa 10, manufactured by Hexion Inc.), 32.6 parts of 2-hydroxyethyl methacrylate, 80.0 parts of butyl propylene glycol, and 97.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, 2.5 parts of polyethylene glycol monooleyl ether (trade name Emalex 510, manufactured by Nihon Emulsion Co., Ltd.) was added as a surfactant and a solid component was adjusted to 50% with butyl propylene glycol to obtain a layer migration control agent [6]. The weight average molecular weight of the synthesized copolymer was 2400, the hydroxyl value was 56 mg KOH/g, and the HLB calculated value was 6.3.

Production Example 7

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 106.4 parts of methoxypolyethylene glycol methacrylate (trade name NK Ester M-40G, manufactured by Shin Nakamura Chemical Co., Ltd.), 8.9 parts of styrene, 62.1 parts of 2-ethylhexyl methacrylate, 72.7 parts of 2-hydroxyethyl methacrylate, 80.0 parts of butyl propylene glycol, and 29.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, 2.5 parts of polyethylene glycol monooleyl ether (trade name Emalex 510, manufactured by Nihon Emulsion Co., Ltd.) was added as a surfactant and a solid component was adjusted to 50% with butyl propylene glycol to obtain a layer migration control agent [7]. The weight average molecular weight of the synthesized copolymer was 4200, the hydroxyl value was 125 mg KOH/g, and the HLB calculated value was 6.2.

Production Example 8

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 136.4 parts of methoxypolyethylene glycol methacrylate (trade name NK Ester M-40G, manufactured by Shin Nakamura Chemical Co., Ltd.), 90.9 parts of 2-ethylhexyl methacrylate, 22.7 parts of 2-hydroxyethyl methacrylate, 80.0 parts of butyl propylene glycol, and 40.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, 2.5 parts of polyethylene glycol monooleyl ether (trade name Emalex 510, manufactured by Nihon Emulsion Co., Ltd.) was added as a surfactant and a solid component was adjusted to 50% with butyl propylene glycol to obtain a layer migration control agent [8]. The weight average molecular weight of the synthesized copolymer was 2200, the hydroxyl value was 39 mg KOH/g, and the HLB calculated value was 7.2.

Production Example 9

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 212.5 parts of methoxypolyethylene glycol methacrylate (trade name NK Ester M-90G, manufactured by Shin Nakamura Chemical Co., Ltd.), 37.5 parts of styrene, 80.0 parts of butyl propylene glycol, and 23.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [9]. The weight average molecular weight of the synthesized copolymer was 3800, the hydroxyl value was 0 mg KOH/g, and the HLB calculated value was 13.6.

Production Example 10

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 75.0 parts of methoxypolyethylene glycol acrylate (trade name Blemmer AME-400, manufactured by NOF CORPORATION), 75.0 parts of polyethylene glycol diacrylate (trade name Blemmer ADE-300, manufactured by NOF CORPORATION), 100.0 parts of stearyl methacrylate, 80.0 parts of butyl propylene glycol, and 30.5 parts of a 55% solution of 2,2-di(t-amylperoxy)butane was charged into the funnel. The mixture was then uniformly dropwise added over 120 min while maintaining the temperature inside the reaction vessel at 1400° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [10]. The weight average molecular weight of the synthesized copolymer was 5500, the hydroxyl value was 0 mg KOH/g, and the HLB calculated value was 9.2.

Production Example 11

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 80.4 parts of poly(ethylene-propylene) glycol monomethacrylate (trade name Blemmer 70PEP-350B, manufactured by NOF CORPORATION), 62.5 parts of polyethylene glycol monoallyl ether (trade name Uniox PKA-5003, manufactured by NOF CORPORATION), 35.7 parts of lauryl methacrylate, 71.4 parts of phenoxyethylene glycol acrylate (trade name NK Ester AMP-10G, manufactured by Shin Nakamura Chemical Co., Ltd.), 57 parts of butyl propylene glycol, and 30.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [11]. The weight average molecular weight of the synthesized copolymer was 3400, the hydroxyl value was 74 mg KOH/g, and the HLB calculated value was 9.0.

Production Example 12

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 212.5 parts of methoxypolyethylene glycol methacrylate (trade name NK Ester M-90G, manufactured by Shin Nakamura Chemical Co., Ltd.), 37.5 parts of behenyl methacrylate, 80.0 parts of butyl propylene glycol, and 19.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [12]. The weight average molecular weight of the synthesized copolymer was 4500, the hydroxyl value was 0 mg KOH/g, and the HLB calculated value was 13.6.

Production Example 13

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 102.5 parts of methoxypolyethylene glycol acrylate (trade name Blemmer AME-400, manufactured by NOF CORPORATION), 147.5 parts of stearyl acrylate, 80.0 parts of butyl propylene glycol, and 9.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [13]. The weight average molecular weight of the synthesized copolymer was 3500, the hydroxyl value was 0 mg KOH/g, and the HLB calculated value was 6.7.

Production Example 14

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 107.5 parts of methoxypolyethylene glycol methacrylate (trade name NK Ester M-90G, manufactured by Shin Nakamura Chemical Co., Ltd.), 142.5 parts of stearyl methacrylate, 80.0 parts of butyl propylene glycol, and 9.0 parts of a 40% solution of t-amylperoxy-2-ethylhexanoate was charged into the funnel. The mixture was then uniformly dropwise added over 120 min while maintaining the temperature inside the reaction vessel at 120° C. Upon completion of dropwise addition, the reaction temperature was maintained for 60 min at 120° C., and the reaction temperature was then adjusted to 100° C. Once the temperature reached 100° C., 4.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [14]. The weight average molecular weight of the synthesized copolymer was 23,500, the hydroxyl value was 0 mg KOH/g, and the HLB calculated value was 6.9.

Production Example 15

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 130.0 parts of methoxypolyethylene glycol methacrylate (trade name Blemmer PME-1000, manufactured by NOF CORPORATION), 120.0 parts of stearyl methacrylate, 80 parts of butyl propylene glycol, and 73.8 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [15]. The weight average molecular weight of the synthesized copolymer was 4400, the hydroxyl value was 0 mg KOH/g, and the HLB calculated value was 9.5.

Production Example 16

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 124.9 parts of methoxypolyethylene glycol methacrylate (trade name NK Ester M-90G, manufactured by Shin Nakamura Chemical Co., Ltd.), 25.0 parts of methoxypolyethylene glycol methacrylate (trade name NK Ester M-450G, manufactured by Shin Nakamura Chemical Co., Ltd.), 25.0 parts of isobornyl methacrylate, 74.9 parts of lauryl methacrylate, 0.25 parts of divinylbenzene, 80.0 parts of butyl propylene glycol, and 25.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [16]. The weight average molecular weight of the synthesized copolymer was 4500, the hydroxyl value was 0 mg KOH/g, and the HLB calculated value was 9.9.

Production Example 17

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 137.5 parts of methoxypolyethylene glycol methacrylate (trade name NK Ester M-90G, manufactured by Shin Nakamura Chemical Co., Ltd.), 112.5 parts of lauryl methacrylate, 80 parts of butyl propylene glycol, and 25.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [17]. The weight average molecular weight of the synthesized copolymer was 4000, the hydroxyl value was 0 mg KOH/g, and the HLB calculated value was 8.8.

Production Example 18

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 222.5 parts of methoxypolyethylene glycol methacrylate (trade name NK Ester M-40G, manufactured by Shin Nakamura Chemical Co., Ltd.), 27.5 parts of stearyl methacrylate, 80 parts of butyl propylene glycol, and 31.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [18]. The weight average molecular weight of the synthesized copolymer was 3600, the hydroxyl value was 0 mg KOH/g, and the HLB calculated value was 11.4.

Production Example 19

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 62.5 parts of methoxypolyethylene glycol acrylate (trade name Blemmer AME-400, manufactured by NOF CORPORATION), 187.5 parts of stearyl acrylate, 80.0 parts of butyl propylene glycol, and 10.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [19]. The weight average molecular weight of the synthesized copolymer was 3500, the hydroxyl value was 0 mg KOH/g, and the HLB calculated value was 4.1.

Production Example 20

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 99.5 parts of methoxypolyethylene glycol methacrylate (trade name NK Ester M-90G, manufactured by Shin Nakamura Chemical Co., Ltd.), 24.9 parts of stearoxypolyethylene glycol methacrylate (trade name Blemmer PSE-1300, manufactured by NOF CORPORATION), 24.9 parts of styrene, 99.5 parts of lauryl methacrylate, 1.2 parts of divinylbenzene, 80 parts of butyl propylene glycol, and 50.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [20]. The weight average molecular weight of the synthesized copolymer was 3600, the hydroxyl value was 0 mg KOH/g, and the HLB calculated value was 7.9.

Production Example 21

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 160.0 parts of methoxypolyethylene glycol methacrylate (trade name NK Ester M-90G, manufactured by Shin Nakamura Chemical Co., Ltd.), 90.0 parts of t-butyl methacrylate, and 34.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [21]. The weight average molecular weight of the synthesized copolymer was 2900, the hydroxyl value was 0 mg KOH/g, and the HLB calculated value was 10.2.

Production Example 22

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 125.0 parts of methoxypolyethylene glycol methacrylate (trade name NK Ester M-90G, manufactured by Shin Nakamura Chemical Co., Ltd.), 25.0 parts of polyethylene glycol dimethacrylate (trade name Blemmer PDE-400, manufactured by NOF CORPORATION), 25.0 parts of isobornyl methacrylate, 75.0 parts of lauryl methacrylate, and 40.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [22]. The weight average molecular weight of the synthesized copolymer was 36,000, the hydroxyl value was 0 mg KOH/g, and the HLB calculated value was 9.4.

Production Example 23

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 126.9 parts of methoxypolyethylene glycol methacrylate (trade name NK Ester M-90G, manufactured by Shin Nakamura Chemical Co., Ltd.), 65.4 parts of lauryl methacrylate, 57.7 parts of reactive silicone (trade name Silaplane FM-0711, manufactured by JNC Corporation), and 2.5 parts of 2,2'-azobis(isobutyric acid)dimethyl was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 2.5 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [23]. The weight average molecular weight of the synthesized copolymer was 61,600, the hydroxyl value was 0 mg KOH/g, and the HLB calculated value was 8.1.

Production Example 24

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 225.0 parts of methoxypolyethylene glycol methacrylate (trade name Blemmer PME-1000, manufactured by NOF CORPORATION), 25.0 parts of lauryl methacrylate, and 20.0 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [24]. The weight average molecular weight of the synthesized copolymer was 5700, the hydroxyl value was 0 mg KOH/g, and the HLB calculated value was 16.4.

Production Example 25

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 175.0 parts of methoxypolyethylene glycol methacrylate (trade name NK Ester M-90G, manufactured by Shin Nakamura Chemical Co., Ltd.), 75.0 parts of 2-ethylhexyl methacrylate, and 3.8 parts of a 40% solution of t-amylperoxy-2-ethylhexanoate was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 3.8 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [25]. The weight average molecular weight of the synthesized copolymer was 53,100, the hydroxyl value was 0 mg KOH/g, and the HLB calculated value was 11.2.

Production Example 26

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 142.1 parts of methoxypolyethylene glycol methacrylate (trade name NK Ester M-90G, manufactured by Shin Nakamura Chemical Co., Ltd.), 95.2 parts of lauryl methacrylate, 11.9 parts of glycidyl methacrylate, 80 parts of butyl propylene glycol, and 25.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C.

Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [26]. The weight average molecular weight of the synthesized copolymer was 4000, the hydroxyl value was 0 mg KOH/g, and the HLB calculated value was 9.1.

Production Example 27

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 142.1 parts of methoxypolyethylene glycol methacrylate (trade name NK Ester M-90G, manufactured by Shin Nakamura Chemical Co., Ltd.), 95.2 parts of lauryl methacrylate, 11.9 parts of N-isopropylacrylamide, 80 parts of butyl propylene glycol, and 28.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [27]. The weight average molecular weight of the synthesized copolymer was 3800, the hydroxyl value was 0 mg KOH/g, and the HLB calculated value was 9.1.

Production Example 28

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 142.1 parts of methoxypolyethylene glycol methacrylate (trade name NK Ester M-90G, manufactured by Shin Nakamura Chemical Co., Ltd.), 95.2 parts of lauryl methacrylate, 11.9 parts of methacrylic acid, 80 parts of butyl propylene glycol, and 30.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [28]. The weight average molecular weight of the synthesized copolymer was 3600 and the hydroxyl value was 0 mg KOH/g.

Production Example 29

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 126.9 parts of methoxypolyethylene glycol methacrylate (trade name NK Ester M-90G, manufactured by Shin Nakamura Chemical Co., Ltd.), 65.4 parts of lauryl methacrylate, 57.7 parts of reactive silicone (trade name Silaplane FM-0711, manufactured by JNC Corporation), and 1.3 parts of 2,2'-azobis(isobutyric acid)dimethyl was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 1.3 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [29]. The weight average molecular weight of the synthesized copolymer was 99,400, the hydroxyl value was 0 mg KOH/g, and the HLB calculated value was 8.1.

Production Example 30

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 12.5 parts of methoxypolyethylene glycol methacrylate (trade name NK Ester M-40G, manufactured by Shin Nakamura Chemical Co., Ltd.), 237.5 parts of methyl methacrylate, and 33.5 parts of a 55% solution of 2,2-di(t-amylperoxy)butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a layer migration control agent [30]. The weight average molecular weight of the synthesized copolymer was 4000, the hydroxyl value was 0 mg KOH/g, and the HLB calculated value was 0.6.

Comparative Production Example 1

A total of 120 parts of butyl propylene glycol was charged in a 1000 ml reaction vessel equipped with a stirring device, a reflux cooler, a dropping funnel, a thermometer, and a nitrogen gas blowing port, and the temperature was raised to 110° C. while introducing nitrogen gas. A mixture including 250 parts of lauryl methacrylate, 5 parts of butyl propylene glycol, and 20 parts of a 40% solution of t-butylperoxy-2-ethylhexanoate was charged into the funnel. The mixture was then uniformly dropwise added over 90 min while maintaining the temperature inside the reaction vessel at 110° C. Upon completion of dropwise addition, the reaction temperature was maintained for 60 min at 110° C. Then, 2.5 parts of a 40% solution of t-butylperoxy-2-ethylhexanoate was added, and the reaction was carried out for 120 min while maintaining the temperature at 110° C. Upon completion of the reaction, a solid component was adjusted to 50% with butyl propylene glycol to obtain a comparative additive [H1]. The weight average molecular weight of the synthesized copolymer was 13,400, the hydroxyl value was 0 mg KOH/g, and the HLB calculated value was 0.0.

Comparative Production Example 2

A total of 120.0 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 250.0 parts of methoxypolyethylene glycol methacrylate (trade name Blemmer PME-1000, manufactured by NOF CORPORATION), 80 parts of butyl propylene glycol, and 73.0 parts of a 55% solution of 2,2-di(t-amylperoxy) butane was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 10.0 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a comparative additive [H2]. The weight average molecular weight of the synthesized copolymer was 4000, the hydroxyl value was 0 mg KOH/g, and the HLB calculated value was 18.2.

Comparative Production Example 3

A total of 120 parts of butyl propylene glycol was charged in a 1000 ml reaction vessel equipped with a stirring device, a reflux cooler, a dropping funnel, a thermometer, and a nitrogen gas blowing port, and the temperature was raised to 140° C. while introducing nitrogen gas. A mixture including 126.9 parts of methoxypolyethylene glycol methacrylate (trade name NK Ester M-90G, manufactured by Shin Nakamura Chemical Co., Ltd.), 65.4 parts of lauryl methacrylate, 57.7 parts of reactive silicone (trade name Silaplane FM-0711, manufactured by JNC Corporation), 80 parts of butyl propylene glycol, and 1.2 parts of a 40% solution of t-amylperoxy-2-ethylhexanoate was charged into the funnel. The mixture was then uniformly dropwise added over 120 min while maintaining the temperature inside the reaction vessel at 140° C. Upon completion of dropwise addition, the reaction temperature was maintained for 60 min at 140° C., and the reaction temperature was then adjusted to 100° C. Once the temperature reached 100° C., 1.2 parts by weight of a 40% solution of t-amylperoxy-2-ethylhexanoate was added, and the reaction was carried out for 120 min while maintaining the temperature at 100° C. Upon completion of the reaction, a solid component was adjusted to 50% with butyl propylene glycol to obtain a comparative additive [H3]. The weight average molecular weight of the synthesized copolymer was 158,200, the hydroxyl value was 0 mg KOH/g, and the HLB calculated value was 8.1.

The weight ratio of monomers in the copolymers synthesized in the Production Examples 1 to 30 and Comparative Production Examples 1 to 3 is shown in Table 1.

[Table 1]

TABLE 1

| | | | | | | Weight ratio of monomers | | | | | | | | | | | | | | |
|---|---|---|---|---|---|---|---|---|---|---|---|---|---|---|---|---|---|---|---|---|
| | | | | | | Production Examples | | | | | | | | | | | | | | |
| | | | | | | 1 | 2 | 3 | 4 | 5 | 6 | 7 | 8 | 9 | 10 | 11 | 12 | 13 | 14 | 15 | 16 | 17 |
| | | R1 | m | n | R2 | | | | | | | | | | | | | | | | | |
| Monomer (A) | NK Ester M-40G*1 | M*3 | 2 | 4 | CH3 | | | 75 | | | 20 | 60 | 60 | | | | | | | | | |
| | NK Ester M-90G*1 | M*3 | 2 | 9 | CH3 | 40 | | | 30 | | | | | | 85 | | 85 | | 43 | | 50 | 55 |
| | Blemmer AME-400*2 | A*4 | 2 | 9 | CH3 | | 50 | | | 30 | | | | | | 30 | | 41 | | | | |
| | Blemmer PME-1000*2 | M*3 | 2 | 23 | CH3 | | | | | | | | | | | | | | | 52 | | |
| | Blemmer PSE-1300*2 | M*3 | 2 | 30 | C18H37 | | | | | | | | | | | | | | | | | |
| | NK Ester M-450G*1 | M*3 | 2 | 45 | CH3 | | 10 | | | | | | | | | | | | | | 10 | |
| | Blemmer PDE-400*2 | M*3 | 2 | 9 | M*3 | | | | | | 30 | | | | | | | | | | | |
| | Blemmer PDE-600*2 | M*3 | 2 | 14 | M*3 | | | | 30 | | | | | | | | | | | | | |
| | Blemmer ADE-300*2 | A*4 | 2 | 7 | A*4 | | | | | 30 | | | | 30 | | | | | | | | |
| | Blemmer 70FEP-350B*2 | M*3 | 2, 3 | 3.5, 2.5 | H | | | | | | | | | | | | 45 | | | | | |
| | Uniox PKA-500*2 | allyl | 2 | 9 | H | | | | | | | | | | | 35 | | | | | | |

TABLE 1-continued

| | | Weight ratio of monomers | | | | | | | | | | | | | | |
|---|---|---|---|---|---|---|---|---|---|---|---|---|---|---|---|---|
| | | Number of carbon atoms | | | | | | | | | | | | | | |
| Monomer (B) | Methyl methacrylate | 1 | | | | | | | | | | | | | | |
| | 1-Butyl methacrylate | 4 | | | | | | | | | | | | | | |
| | Styrene | 6 | | | | | | 5 | | 15 | | | | | | |
| | 2-Ethylhexyl methacrylate | 8 | | 5 | | | | | 35 | 40 | | | | | | |
| | Vinyl 2,2-dimethyloctanoate | 10 | 60 | 40 | 10 | | 50 | | | | | | | | | |
| | Isobornyl methacrylate | 10 | | | | | | | | | | | | | 10 | |
| | Lauryl methacrylate | 12 | | | 40 | | | | 20 | | | | | 57 | 30 | 45 |
| | Stearyl methacrylate | 18 | | | | | | | 40 | | | | 59 | 48 | | |
| | Stearyl acrylate | 18 | | 10 | | 40 | | | | | | | | | | |
| | Behenyl methacrylate | 22 | | | | | | | | | | 15 | | | | |
| Monomer (C) | 2-Hydroxyethyl methacrylate | | 15 | | 40 | 5 | | 15 | 41 | 10 | | | | | | |
| | 2-Hydroxyethyl acrylate | | | 5 | | 40 | | | | | | | | | | |
| | Silapiane FM-0711*5 | | | | | | | | | | | | | | | |
| | Divinylbenzene | | | | | | | | | | | | | | | 0.1 |
| | NK Ester AMP-10G*1 | | | | | | | | | | 40 | | | | | |
| | Glycidyl methacrylate | | | | | | | | | | | | | | | |
| | N-isopropylacrylamide | | | | | | | | | | | | | | | |
| | Methacrylic acid | | | | | | | | | | | | | | | |

| | | | | | | | | | Production Examples | | | | | | | | Comparative Production Examples | | |
|---|---|---|---|---|---|---|---|---|---|---|---|---|---|---|---|---|---|---|---|---|
| | | | | | | 18 | 19 | 20 | 21 | 22 | 23 | 24 | 25 | 26 | 27 | 28 | 29 | 30 | 1 | 2 | 3 |
| | | R1 | m | n | R2 | | | | | | | | | | | | | | | | |
| Monomer (A) | NK Ester M-40G*1 | M*3 | 2 | 4 | CH3 | 89 | | | | | | | | | | | 5 | | | | |
| | NK Ester M-90G*1 | M*3 | 2 | 9 | CH3 | | | | 40 | 64 | 50 | 88 | | 70 | 60 | 80 | 80 | 88 | | | 68 |
| | Blemmer AME-400*2 | A*4 | 2 | 9 | CH3 | | 25 | | | | | | | | | | | | | | |
| | Blemmer PME-1000*2 | M*3 | 2 | 23 | CH3 | | | | | | | | 90 | | | | | | | 100 | |
| | Blemmer PSE-1300*2 | M*3 | 2 | 30 | C18H37 | | | 10 | | | | | | | | | | | | | |
| | NK Ester M-450G*1 | M*3 | 2 | 45 | CH3 | | | | | | | 10 | | | | | | | | | |
| | Blemmer PDE-400*2 | M*3 | 2 | 9 | M*3 | | | | | | | | | 10 | | | | | | | |
| | Blemmer PDE-600*2 | M*3 | 2 | 14 | M*3 | | | | | | | | | | | | | | | | |
| | Blemmer ADE-300*2 | A*4 | 2 | 7 | A*4 | | | | | | | | | | | | | | | | |
| | Blemmer 70FEP-350B*2 | M*3 | 2, 3 | 3.5, 2.5 | H | | | | | | | | | | | | | | | | |
| | Uniox PKA-5003*2 | allyl | 2 | 9 | H | | | | | | | | | | | | | | | | |

| | | Number of carbon atoms | | | | | | | | | | | | | | | | | |
|---|---|---|---|---|---|---|---|---|---|---|---|---|---|---|---|---|---|---|---|
| Monomer (B) | Methyl methacrylate | 1 | | | | | | | | | | | | | 95 | | |
| | 1-Butyl methacrylate | 4 | | | | 38 | | | | | | | | | | | |
| | Styrene | 6 | | | 10 | | | | | | | | | | | | |
| | 2-Ethylhexyl methacrylate | 8 | | | | | | | 30 | | | | | | | | |
| | Vinyl 2,2-dimethyloctanoate | 10 | | | | | | | | | | | | | | | |
| | Isobornyl methacrylate | 10 | | | | | | 10 | | | | | | | | | |
| | Lauryl methacrylate | 12 | | | | 40 | | 30 | 34 | 10 | | 40 | 40 | 40 | 34 | | 100 | 34 |
| | Stearyl methacrylate | 18 | 11 | | | | | | | | | | | | | | |
| | Stearyl acrylate | 18 | | 75 | | | | | | | | | | | | | |
| | Behenyl methacrylate | 22 | | | | | | | | | | | | | | | |

TABLE 1-continued

Weight ratio of monomers

| Monomer (C) | | | | | |
|---|---|---|---|---|---|
| 2-Hydroxyethyl methacrylate | | | | | 95 |
| 2-Hydroxyethyl acrylate | | | | | |
| Silapiane FM-0711*5 | | 30 | 30 | | 30 |
| Divinylbenzene | 0.5 | | | | |
| NK Ester AMP-10G*1 | | | | | |
| Glycidyl methacrylate | | | 5 | | |
| N-isopropylacrylamide | | | | 5 | |
| Methacrylic acid | | | | | 5 |

*1 Manufactured by Shin Nakamura Chemical Co., Ltd.
*2 Manufactured by Nippon Oil & Fats Co., Ltd.
*3 M: methacrylate
*4 A: acrylate
*5 Manufactured by JNC Corporation Test Examples The performance tests of the layer migration control agents were conducted using aqueous metallic paint (I) shown in Table 2, aqueous metallic paint(II) shown in Table 3, a clear paint shown in Table 4, and an aqueous primer paint shown in Table 5.

TABLE 2

Test formulation (I) of metallic paints

| Name of starting materials | Weight (parts) | Suppliers of starting materials |
|---|---|---|
| Formulation A | | |
| Asahi Kasei Alumipaste MH-8801 (aluminum paste: aluminum solid component 65%) | 8.7 | Asahi Kasei Metals Ltd. |
| Butyl propylene glycol (organic solvent) | 2.9 | |
| Sannix PP-400 (polyoxypropylene glycol: resin solid component 100%) | 1.4 | Sanyo Chemical Industries, Ltd. |
| Sannix PP-1000 (polyoxypropylene glycol: resin solid component 100%) | 2.8 | Sanyo Chemical Industries, Ltd. |
| Formulation B | | |
| Water Sol ACD-2001 (acrylic dispersion: resin solid component 40%) | 72.8 | DIC Corporation |
| NACURE 4054J (phosphoric acid ester: solid component 50%) | 1.0 | KING Industrys Inc. |
| Formulation C | | |
| Cymel 251 (hydrophobic melamine resin: resin solid component 80%) | 10.4 | Allnex Japan Inc. |

TABLE 3

Test formulation (II) of metallic paints

| Name of starting materials | Weight (parts) | Suppliers of starting materials |
|---|---|---|
| Formulation A | | |
| Asahi Kasei Alumipaste MH-8801 (aluminum paste: aluminum solid component 65%) | 9.7 | Asahi Kasei Metals Ltd. |
| Butyl propylene glycol (organic solvent) | 3.2 | |
| Sannix PP-400 (polyoxypropylene glycol: resin solid component 100%) | 1.5 | Sanyo Chemical Industries, Ltd. |
| Sannix PP-1000 (polyoxypropylene glycol: resin solid component 100%) | 3.1 | Sanyo Chemical Industries, Ltd. |
| Formulation B | | |
| Water Sol ACD-2001 (acrylic dispersion: resin solid component 40%) | 58.0 | DIC Corporation |
| NACURE 4054J (phosphoric acid ester: solid component 50%) | 1.2 | KING Industrys Inc. |
| Formulation C | | |
| Cymel 251 (hydrophobic melamine resin: resin solid component 80%) | 23.2 | Allnex Japan Inc. |

TABLE 4

Test formulation of clear paints

| Name of starting materials | Weight (parts) | Suppliers of starting materials |
|---|---|---|
| Desmodur N3300 (isocyanate compound: resin solid component 70%) | 20.2 | Covestro Ltd. |
| Desmophen A870BA (acryl polyol: resin solid component 100%) | 60.0 | Covestro Ltd. |
| Butyl acetate (organic solvent) | 19.8 | |
| Disparlon SPL-93 (surface adjusting agent: solid component 15%) | 0.2 | KUSUMOTO CHEMICALS, LTD. |

TABLE 5

Test formulation of aqueous prime paint

| Name of starting materials | Weight (parts) | Suppliers of starting materials |
|---|---|---|
| Aqueous Fine Sealer White (aqueous prime paint: resin solid component 25%) | 100.0 | Nippon Paint Co., Ltd. |

Preparation of Metallic Paint (1)

A metallic paint was prepared by mixing a formulation A and a formulation C with a formulation B described in Table 2 by using a laboratory disperser. A layer migration control agent was then mixed with the metallic paint by using a laboratory disperser so that the copolymer solid component amount in the layer migration control agent was 3 parts by weight to 15 parts by weight per 100 parts by weight of the resin solid component in the metallic paint, thereby preparing a metallic paint (I). A metallic paint (I) to which the layer migration control agent was not added was prepared by the same method. This paint was referred to as Blank (I).

Preparation of Metallic Paint (II)

A metallic paint (II) and Blank (II) were prepared by the same method as the metallic formulation (I), except that the metallic composition (II) described in Table 3 was used.

Preparation of Clear Paint

A clear paint was prepared by mixing according to the formulation as described in Table 4 by using a laboratory disperser.

Preparation of Aqueous Prime Paint

An aqueous prime paint was prepared by mixing a layer migration control agent by using a laboratory disperser with the commercial aqueous prime paint described in Table 5, so that the copolymer solid component in the layer migration control agent was 3 parts by weight to 9 parts by weight per 100 parts by weight of the resin solid component of the aqueous prime paint. The commercial aqueous prime paint described in Table 5 was referred to as Blank (III).

Coating Film Appearance Test Example (I). Test Method

The viscosity of the metallic paint (I) was adjusted to 40 sec at 20° C. by using a Ford cup #4 and adding distilled water. The metallic paint (I) was then coated with an air sprayer on two tin plates to obtain a film thickness of 15±2 μm after baking. The coating was allowed to stand for 10 min at room temperature and then dried by preheating for 3 min at 80° C. Of the two obtained plates with a metallic coating, one coated plate was cured by heating for 30 min at 140° C. to produce a single-layer coating film for appearance evaluation.

The other plate with a metallic coating was coated, without curing, with a clear paint on the surface thereof by using an air sprayer to obtain a dry film thickness of 30 μm to 40 μm. The viscosity of the clear paint was adjusted to 14 sec at 20° C. by using a Ford cup #4 and adding butyl acetate. The coated sheet was allowed to stand for 10 min at room temperature and then heated for 30 min at 140° C. to cure the two layers at the same time and obtain a multilayer coating film for appearance evaluation, this coating film being produced by the so-called two-coat one-bake method.

The coating film appearance was evaluated by using a multi-angle spectrophotometer (trade name MA68II, manufactured by X-Rite Inc.), measuring L* at reflection angles of 15°, 45°, and 110° with respect to the incidence angle of the coating film, and calculating a FI value (flop index) by using the following formula 2. The greater the FI value is, the superior the appearance of the coating film is.

$$FI=2.69\times(L*15°-L*110°)^{1.11}\div(L*45°)^{0.86}$$ Formula 2

Finish appearance was compared by calculating an absolute value of the difference between the FI value of the single-layer coating film and the FI value of the multilayer coating film as ΔFI. Color return caused by layer migration occurs at a large ΔFI, thereby indicating the degradation of coating film appearance. The following evaluation criteria of finish appearance were used: ΔFI=0 to 2: **; ΔFI=2 and 3: *; ΔFI=3 and 4: **; and ΔFI=4 or more: *.

Coating Film Appearance Test Example (II). Test Method

The test and evaluation were performed by the same method as in Coating Film Appearance Test Example (I), except that the metallic paint (II) was used.

Coating Film Water Resistance Test Example (I). Test Method

The viscosity of the metallic paint (I) was adjusted to 40 sec at 20° C. by using a Ford cup #4 and adding distilled water. The metallic paint (I) was then coated with an air sprayer on an electrodeposited sheet to obtain a film thickness of 15±2 μm after baking. The coating was allowed to stand for 10 min at room temperature and then dried by preheating for 3 min at 80° C. The sheet with uncured metallic coating was then coated with a clear paint by using an air sprayer to obtain a dry film thickness of 30 μm to 40 μm. The viscosity of the clear paint was adjusted to 14 sec at 20° C. by using a Ford cup #4 and adding butyl acetate. The coated sheet was allowed to stand for 10 min at room temperature and then heated for 30 min at 140° C. to cure the two layers at the same time and obtain a multilayer coating film for a water resistance test, this coating film being produced by the so-called two-coat one-bake method.

The multilayer coating film was immersed for 10 days in tap water adjusted to a temperature of 40° C. The discoloration state was visually evaluated within 10 min after removal from the water tank. The evaluation symbols **, *, and * were used when degree of discoloration was respectively better than, same as, and worse than that of the coated sheet (Blank (I) in Table 6) which used a metallic paint including no layer migration control agent.

Coating Film Water Resistance Test Example (II). Test Method

The test and evaluation were performed by the same method as in Coating Film Water Resistance Test Example (I), except that the metallic paint (II) was used. Comparative evaluation was performed with the coated sheet (Blank (II) in Table 7) using the metallic paint including no layer migration control agent of the present invention.

The results of the test example (I) are shown in Table 6, and the results of the test example (II) are shown in Table 7. It is clear that the addition of the layer migration control agent of the present invention to the paint improves the coating film appearance without causing the discoloration effect in the water resistance test.

Finger Contact Dryness Test (III). Test Method

An aqueous prime paint was coated with a bar coater on a tin plate under the conditions of a temperature of 24° C. and a moisture content of 50% to obtain a film thickness of 18±2 μm after curing. The presence or absence of adhesive feel on the coated surface was examined by finger contact every 5 min, and the time at which the finger stopped sticking to the coating film was taken as a finger contact drying time.

The external appearance of the coating film was visually evaluated in the following manner.

The appearance same as that of Blank (III) was evaluated as ****, and when repelling or caving was observed, the appearance was evaluated as *.

The results obtained in the test example (III) are shown in Table 8. It is clear that the addition of the layer migration control agent of the present invention to the paint shortens the drying time without producing an adverse effect on the coating paint appearance.

TABLE 6

Results of test example (I)

| | Test metallic composition | Amount added (%) | Finish appearance | Water resistance |
|---|---|---|---|---|
| Blank (I) | I | 0 | * | *** |
| Layer mixing control agent [1] | I | 10 | **** | **** |
| | | 15 | **** | **** |
| Layer mixing control agent [2] | I | 10 | **** | **** |
| Layer mixing control agent [3] | I | 10 | **** | **** |
| Layer mixing control agent [4] | I | 10 | **** | **** |
| Layer mixing control agent [5] | I | 10 | **** | **** |
| Layer mixing control agent [6] | I | 10 | **** | **** |
| Layer mixing control agent [7] | I | 10 | **** | **** |
| Layer mixing control agent [8] | I | 10 | **** | **** |
| Layer mixing control agent [9] | I | 10 | **** | *** |
| Layer mixing control agent [10] | I | 10 | **** | *** |
| Layer mixing control agent [11] | I | 10 | **** | *** |
| Layer mixing control agent [12] | I | 10 | **** | *** |
| Layer mixing control agent [13] | I | 10 | **** | *** |
| Layer mixing control agent [14] | I | 10 | **** | *** |
| Layer mixing control agent [15] | I | 10 | **** | *** |
| Layer mixing control agent [16] | I | 10 | **** | *** |
| Layer mixing control agent [17] | I | 3 | *** | **** |
| Layer mixing control agent [18] | I | 10 | *** | *** |
| Layer mixing control agent [19] | I | 10 | *** | *** |
| Layer mixing control agent [20] | I | 10 | *** | *** |
| Layer mixing control agent [21] | I | 10 | *** | *** |
| Layer mixing control agent [22] | I | 10 | *** | *** |
| Layer mixing control agent [23] | I | 10 | *** | *** |
| Layer mixing control agent [24] | I | 10 | *** | *** |
| Layer mixing control agent [25] | I | 10 | *** | *** |
| Layer mixing control agent [26] | I | 10 | *** | *** |
| Layer mixing control agent [27] | I | 10 | *** | *** |
| Layer mixing control agent [28] | I | 10 | *** | *** |
| Layer mixing control agent [29] | I | 10 | ** | *** |
| Layer mixing control agent [30] | I | 10 | ** | *** |
| Comparative additive [H-1] | I | 10 | * | *** |
| Comparative additive [H-2] | I | 10 | *** | * |
| Comparative additive [H-3] | I | 10 | ** | * |

TABLE 7

Results of test example (II)

| | Test metallic composition | Amount added (%) | Finish appearance | Water resistance |
|---|---|---|---|---|
| Blank (II) | II | 0 | * | *** |
| Layer mixing control agent [3] | II | 10 | **** | **** |
| Layer mixing control agent [4] | II | 10 | **** | **** |
| Comparative additive [H-1] | II | 10 | * | *** |

TABLE 8

Results of test example (III)

| | Amount added (%) | Finger contact drying time (min) | Appearance (visual evaluation) |
|---|---|---|---|
| Blank (III) | 0 | 65 | **** |
| Layer mixing control agent [1] | 3 | 40 | **** |
| Layer mixing control agent [4] | 3 | 40 | **** |
| Layer mixing control agent [8] | 3 | 55 | **** |
| Layer mixing control agent [11] | 3 | 50 | **** |
| Layer mixing control agent [12] | 3 | 55 | **** |
| Layer mixing control agent [13] | 3 | 45 | **** |
| Layer mixing control agent [14] | 3 | 55 | **** |
| Layer mixing control agent [15] | 3 | 55 | **** |
| Layer mixing control agent [16] | 3 | 50 | **** |
| Layer mixing control agent [17] | 3 | 35 | **** |

TABLE 8-continued

Results of test example (III)

| | Amount added (%) | Finger contact drying time (min) | Appearance (visual evaluation) |
|---|---|---|---|
| Layer mixing control agent [18] | 3 | 40 | **** |
| Layer mixing control agent [19] | 3 | 55 | **** |
| Layer mixing control agent [20] | 3 | 55 | **** |
| Layer mixing control agent [21] | 9 | 30 | **** |
| Layer mixing control agent [22] | 3 | 45 | **** |
| Layer mixing control agent [23] | 3 | 60 | **** |
| Layer mixing control agent [24] | 3 | 55 | **** |
| Layer mixing control agent [25] | 3 | 50 | **** |
| Layer mixing control agent [30] | 3 | 45 | **** |
| Comparative additive [H-1] | 3 | 60 | * |
| Comparative additive [H-2] | 3 | 65 | **** |

The invention claimed is:

1. An aqueous paint composition comprising a layer migration control,
   wherein the layer migration control agent comprises a copolymer obtained by polymerization of a monomer mixture including
   5% by weight to 90% by weight of a polymerizable unsaturated monomer (A) including at least one kind of ether group selected from a group represented by the following chemical formula (1):

$$R^1-(C_mH_{2m}O)_n-R^2 \quad (1)$$

wherein, in the chemical formula (1), $R^1$ is a (meth) acryl group, a vinyl ether group, or an allyl group;

R² is a (meth)acryl group, a vinyl ether group, an allyl group, or an alkyl group having 1 to 22 carbon atoms; m is a number of 2 to 4; n is a number of 2 to 100, and 10% by weight to 95% by weight of a polymerizable unsaturated monomer (B) of at least one kind selected from the group consisting of polymerizable unsaturated monomers having a hydrophobic group, and wherein the copolymer has a weight average molecular weight of 1000 to 100,000, wherein the copolymer has an HLB value of 0.5 to 17.0, and wherein the layer migration control agent is present at 3% by weight to 15% by weight per weight on the basis of solid component of the resin contained in the paint.

2. An article coated with the aqueous paint composition according to claim 1.

3. A method for forming a multilayer coating film, comprising:
   (1) a step of prime-coating the aqueous paint composition according to claim 1 on a coating object;
   (2) a step of coating a top paint composition on the uncured prime coated surface; and
   (3) a step of heating the uncured multilayer coating film to cure both prime and top coating films at the same time.

4. The method for forming a multilayer coating film according to claim 3, wherein the prime paint composition includes an aqueous resin and a hydrophobic melamine resin as film-forming resin components, and a solid component mixing ratio of the hydrophobic melamine resin to the aqueous resin is 20-40 to 60-80 as a weight ratio.

5. An aqueous paint composition comprising a layer migration control,
   wherein the layer migration control agent comprises a copolymer obtained by polymerization of a monomer mixture including
      a polymerizable unsaturated monomer (A) including at least one kind of ether group selected from a group represented by the following chemical formula (1):

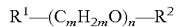
(1)

wherein, in the chemical formula (1), R¹ is a (meth) acryl group, a vinyl ether group, or an allyl group; R² is a (meth)acryl group, a vinyl ether group, an allyl group, or an alkyl group having 1 to 22 carbon atoms; m is a number of 2 to 4; n is a number of 2 to 100, a polymerizable unsaturated monomer (B) of at least one kind selected from the group consisting of polymerizable unsaturated monomers having a hydrophobic group, and a polymerizable unsaturated monomer (C) of at least one kind selected from the group consisting of copolymerizable unsaturated monomers, wherein the monomer mixture includes 100 parts by weight of a mixture of 5% by weight to 90% by weight of the monomer (A) and 10% by weight to 95% by weight of the monomer (B), and 50 parts by weight or less of the monomer (C), and wherein the weight average molecular weight of the copolymer is 1000 to 100,000, wherein the copolymer has an HLB value of 0.5 to 17.0, and wherein the layer migration control agent is present at 3% by weight to 15% by weight per weight on the basis of solid component of the resin contained in the paint.

6. An article coated with the aqueous paint composition according to claim 5.

7. A method for forming a multilayer coating film, comprising:
   (1) a step of prime-coating the aqueous paint composition according to claim 5 on a coating object;
   (2) a step of coating a top paint composition on the uncured prime coated surface; and
   (3) a step of heating the uncured multilayer coating film to cure both prime and top coating films at the same time.

8. The method for forming a multilayer coating film according to claim 5, wherein the prime paint composition includes an aqueous resin and a hydrophobic melamine resin as film-forming resin components, and a solid component mixing ratio of the hydrophobic melamine resin to the aqueous resin is 20-40 to 60-80 as a weight ratio.

* * * * *